(12) United States Patent
Booth et al.

(10) Patent No.: US 11,168,618 B2
(45) Date of Patent: Nov. 9, 2021

(54) SHAFT APPARATUS FOR A GAS TURBINE ENGINE

(71) Applicant: ROLLS-ROYCE plc, London (GB)

(72) Inventors: Michael Booth, Derby (GB); Steven P. Culwick, Derby (GB)

(73) Assignee: Rolls-Royce plc

( * ) Notice: Subject to any disclaimer, the term of this patent is extended or adjusted under 35 U.S.C. 154(b) by 45 days.

(21) Appl. No.: 16/800,000

(22) Filed: Feb. 25, 2020

(65) Prior Publication Data

US 2020/0284202 A1 Sep. 10, 2020

(30) Foreign Application Priority Data

Mar. 6, 2019 (GB) ..................................... 1902980

(51) Int. Cl.
*F02C 7/36* (2006.01)

(52) U.S. Cl.
CPC ............ *F02C 7/36* (2013.01); *F05D 2260/40* (2013.01)

(58) Field of Classification Search
CPC .. F02C 7/36; F05D 2260/40; F05D 2250/411; F05D 2270/09; F05D 2220/36; Y02T 50/60; F02K 3/06; F16D 43/2024
See application file for complete search history.

(56) References Cited

U.S. PATENT DOCUMENTS

| 5,205,386 | A | 4/1993 | Goodman et al. |
| 10,316,745 | B2 | 6/2019 | Sheridan et al. |
| 2006/0090451 | A1* | 5/2006 | Moniz ...................... F01D 1/24 60/226.1 |

FOREIGN PATENT DOCUMENTS

| CN | 103486154 | | 1/2014 | |
| EP | 3002476 | | 4/2016 | |
| EP | 3396115 | | 10/2018 | |
| GB | 744923 | | 2/1956 | |
| GB | 790550 | | 2/1958 | |
| GB | 866046 | | 4/1961 | |
| GB | 866046 | A * | 4/1961 | ............. F16D 41/22 |
| WO | 2019092910 | | 5/2019 | |

OTHER PUBLICATIONS

Great Britain search report dated Aug. 20, 2019, issued in GB Patent Application No. 1902980.0.
European search report dated Jul. 2, 2020, issued in EP Patent Application No. 20157725.

* cited by examiner

*Primary Examiner* — Jacob M Amick
*Assistant Examiner* — Charles J Brauch
(74) *Attorney, Agent, or Firm* — Barnes & Thornburg LLP (57) ABSTRACT

A shaft apparatus for a gas turbine engine comprising: a first shaft portion; a second shaft portion; and a ratchet mechanism configured to permit the first shaft portion to rotate with respect to the second shaft portion in a first direction, and to prevent the first shaft portion from rotating with respect to the second shaft portion in a second direction opposite to the first direction. A gas turbine engines comprising the shaft apparatus and methods of operating a gas turbine engine are also disclosed.

12 Claims, 7 Drawing Sheets

SHAFT APPARATUS FOR A GAS TURBINE ENGINE

CROSS-REFERENCE TO RELATED APPLICATIONS

This specification is based upon and claims the benefit of priority from UK Patent Application Number 1902980.0 filed on 6 Mar. 2019, the entire contents of which are incorporated herein by reference.

BACKGROUND

Technical Field

The present disclosure relates to shaft apparatus for gas turbine engines, and more particularly to seizure protection for fan shafts in gas turbine engines.

Description of the Related Art

Large bypass gas turbine engines present significant drag when the engine is not operating. If the fan is unable to rotate freely (known as windmilling) then the drag caused by the fan can be large enough to exceed the inputs of other control surfaces of the aircraft, which may cause a catastrophic loss of aircraft control.

It may not be possible to eliminate all fan shaft seizure threats and therefore a means of protection is required to ensure that the fan is permitted to windmill in the event of a fan shaft seizure. A sudden seizure of the fan shaft while it is being powered would typically create a large torque spike that can be protected against using a torque fuse. However a progressive failure exhibiting a gradual increase in shaft friction up to the point of seizure cannot be guaranteed to generate a torque spike that is sufficiently above the normal operating torque to allow a torque fuse to be used.

Accordingly, it will be understood that improvements in seizure protection in fan shafts for gas turbine engines may be required.

SUMMARY

According to a first aspect there is provided a shaft apparatus for a gas turbine engine comprising a first shaft portion, a second shaft portion, and a ratchet mechanism configured to permit the first shaft portion to rotate with respect to the second shaft portion in a first direction, and to prevent the first shaft portion from rotating with respect to the second shaft portion in a second direction opposite to the first direction, wherein the ratchet mechanism comprises a first ratchet element configured to rotate with the first shaft portion, and a second ratchet element configured to rotate with the second shaft portion, each of the first and second ratchet elements comprise a respective ratchet surface for engagement with the ratchet surface of the other of the first or second ratchet element; and, the ratchet mechanism is configured such that downstream axial movement of the first shaft portion relative to the second shaft portion causes the ratchet surfaces of the first and second ratchet elements to be disengaged.

In other words, the ratchet mechanism may be configured such that: a) the first shaft portion is permitted to rotate faster than the second shaft portion in the first direction; b) the second shaft portion may not rotate faster than the first shaft portion in the first direction (i.e. the first shaft portion must rotate at least as fast as the second shaft portion in the first direction); and c) the first shaft portion may not rotate relative to the second shaft portion in the second direction (i.e. if the first shaft portion is rotating in the second direction, then the second shaft portion must also be rotating at the same speed in the second direction). The ratchet mechanism may permit the second shaft portion to apply a torque to the first shaft portion, but prevent the first shaft portion from applying a torque to the second shaft portion.

The shaft apparatus may be a fan shaft apparatus. The first shaft portion may be configured for attachment to a fan of a gas turbine engine. The second shaft portion may be configured to apply a driving torque to the first shaft portion in the first direction so as to drive a fan attached to the first shaft portion.

The ratchet mechanism may comprise a first ratchet element configured to rotate with the first shaft portion, and a second ratchet element configured to rotate with the second shaft portion.

The first ratchet element may be arranged axially downstream of the second ratchet element.

The axial direction may refer to any direction parallel to a rotational axis of the first and/or second shaft portions, or may refer to any direction parallel to the principal rotational axis of the gas turbine engine. Downstream in the axial direction generally refers to the direction of the exhaust end of the engine, while upstream refers generally to the direction of the intake end of the engine.

The ratchet surface of the first ratchet element may be configured to face at least partially upstream in an axial direction, and wherein the ratchet surface of the second ratchet element is configured to face at least partially downstream in an axial direction.

The ratchet mechanism may comprise a curvic coupling.

The ratchet mechanism may comprise a clutch.

According to a second aspect, there is provided a gas turbine engine for an aircraft comprising a shaft apparatus according to the first aspect described above.

The gas turbine engine may further comprise an engine core comprising a turbine, a compressor, and a core shaft connecting the turbine to the compressor; a fan located upstream of the engine core, the fan comprising a plurality of fan blades and being attached to the first shaft portion; and a gearbox that receives an input from the core shaft and outputs drive to the fan via the second shaft portion so as to drive the fan at a lower rotational speed than the core shaft.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

According to a third aspect, there is provided a method of providing seizure protection in an engine comprising a fan and a torque shaft for driving the fan in a first direction comprising permitting the fan to rotate relative to the torque shaft in the first direction, and preventing the fan from rotating relative to the torque shaft in a second direction opposite to the first direction.

A shaft apparatus according the first aspect above may be provided to permit and prevent relative rotation of the fan with respect to the torque shaft in the first and second directions respectively.

The torque shaft may comprise or may be the second shaft portion. The fan may comprise or may be attached to the first shaft portion.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e. the values may form upper or lower bounds), for example in the range of from 80 Nkg$^{-1}$s to 100 Nkg$^{-1}$s, or 85 Nkg$^{-1}$s to 95 Nkg$^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
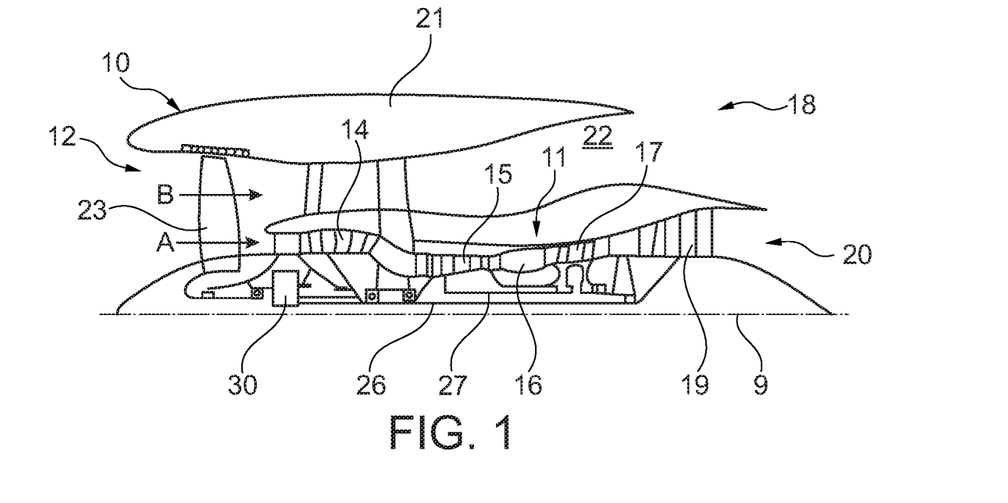
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
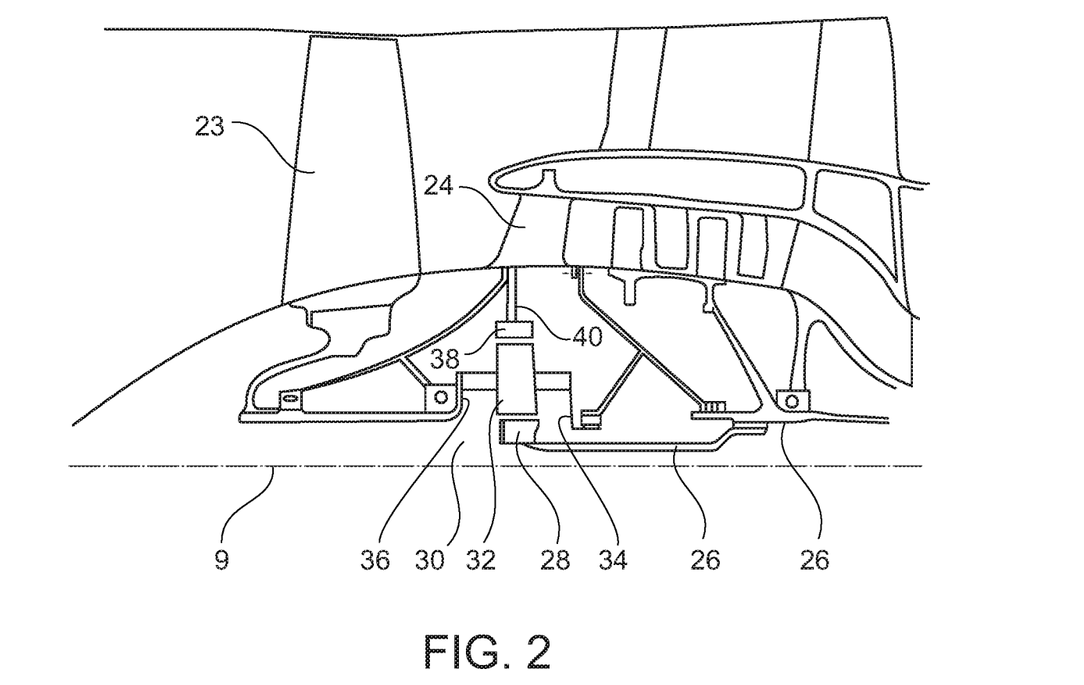
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
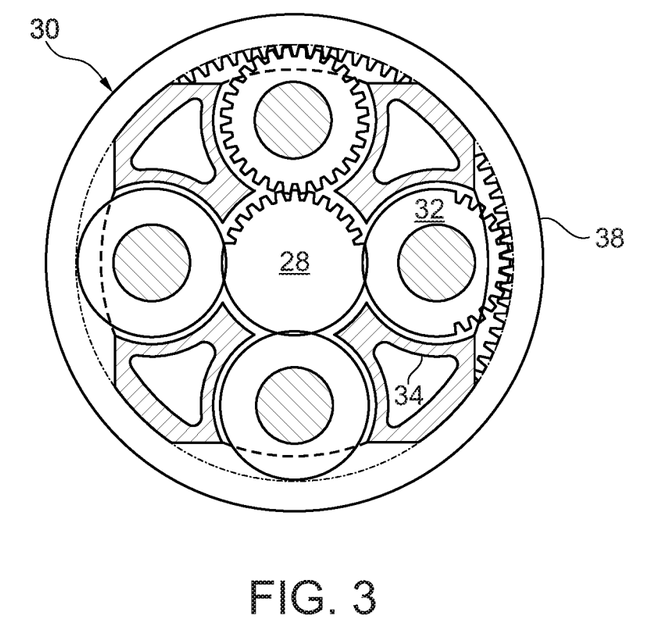
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Driven and Windmill Conditions of a Gas Turbine Engine

Figure 4A:
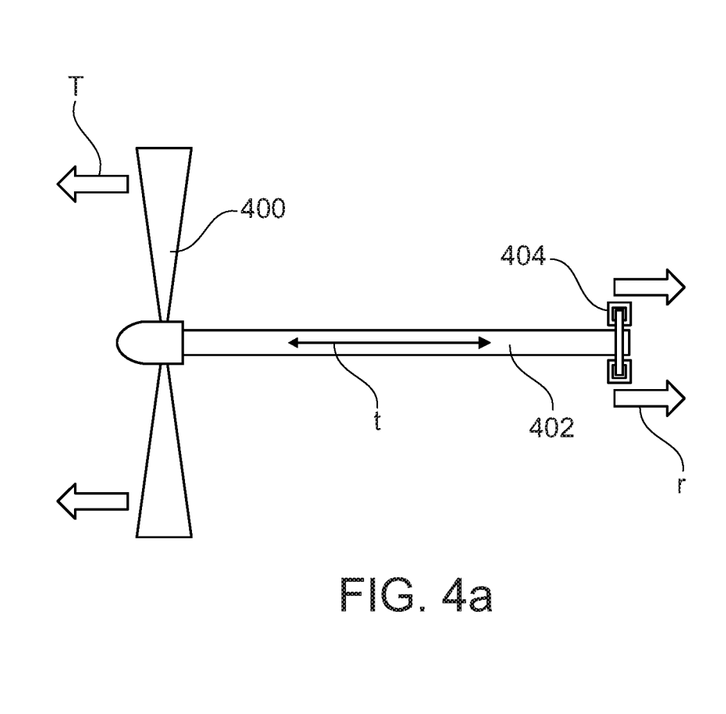
FIGS. 4a and 4b are schematic views of a fan and torque shaft of a gas turbine engine in a first, driven, condition.
Figure 4B:
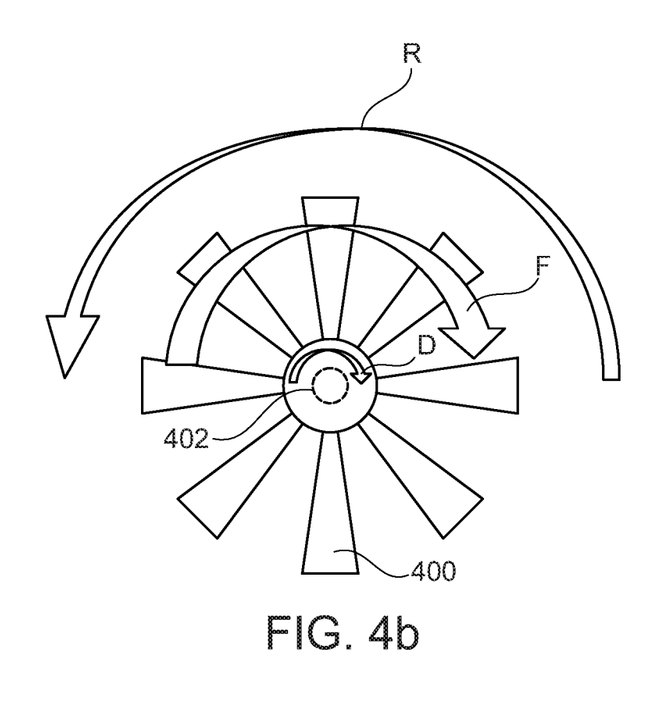

FIGS. 4a and 4b schematically show a generic fan 400 and torque shaft 402 of a gas turbine engine in normal, driven operation. FIG. 4 shows a side view of the system to illustrate the axial forces, while FIG. 4b shows a front view of the system along the axis of the torque shaft to illustrate the rotational aspects of the system, such as torques.

In driven operation, the turbines of the engine apply a driving torque to the torque shaft 402 (either directly or via a gearbox as described above), and the fan 400 is attached to the torque shaft 402 such that the fan is driven in the direction of arrow F in FIG. 4 b. Arrow D in FIG. 4b represents the driving torque applied by the torque shaft 402 to the fan 400. It will be understood that a reaction torque (as represented by arrow R) will be applied to the fan 400 and the shaft 402 by the aerodynamic resistance of the fan 400 as it is rotated. It should be understood that the torque shaft 402 applies a driving torque to the fan in a first rotational direction, represented by the arrow F.

Referring to FIG. 4a, the fan 400, when driven, generates a forward axial thrust T represented by arrows, which is applied to the torque shaft 402. This thrust force is reacted by a thrust bearing 404 as a reaction force r. Accordingly, in the driven state, the torque shaft 402 experiences a tensile axial load, as represented by arrow t.

Figure 5A:
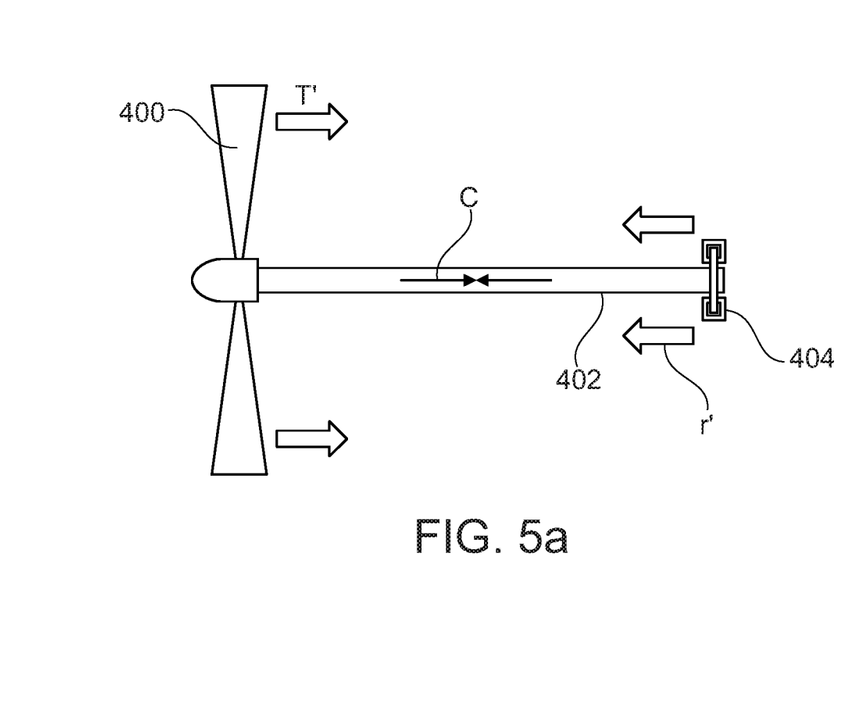
FIGS. 5a and 5b are schematic views of a gas turbine engine in a second, windmilling condition.
Figure 5B:
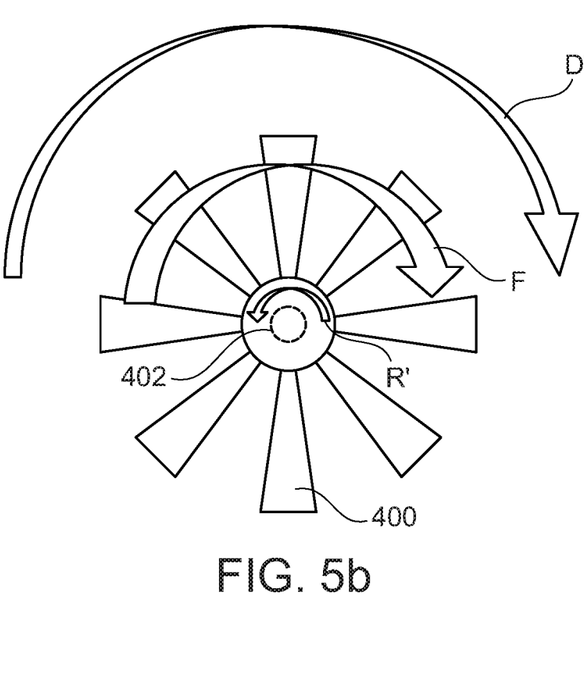

FIGS. 5a and 5b schematically show the same generic fan 400 and torque shaft 402 in windmilling operation. FIG. 5a shows a side view of the system to illustrate the axial forces, while FIG. 5b shows a front view of the system along the axis of the torque shaft to illustrate the rotational aspects of the system, such as torques.

In this example, it is assumed that the torque shaft has not seized, and the shaft 402 and fan 400 are free to rotate together. In windmilling operation, no driving torque is applied to the torque shaft 402 (and therefore the fan 400) by the engine. Instead, as the fan 400 moves through the air, the air applies a torque to the fan 400 which causes the fan 400 to rotate freely or 'windmill' in the direction of arrow F. It is important to t note that the fan 400 rotates in the same direction during windmilling as when it is driven.

However, as can be seen in FIG. 5b, the torques applied to the system have reversed. Now, the fan 400 undergoes a torque D' in the same direction as its rotation F, while the torque shaft 402 applies a reaction torque R' owing to the inherent mechanical resistance of the shaft 402 to rotation.

Referring to FIG. 5a, the fan 400, when windmilling, is pushed axially rearward by the oncoming air, which generates a rearward axial force T' represented by arrows, which is applied to the torque shaft 402. This force is reacted by a thrust bearing 404 as a reaction force r'. Accordingly, in the windmill state, the torque shaft 402 experiences a compressive axial load, as represented by arrow C.

Shaft Apparatus

Figure 6:
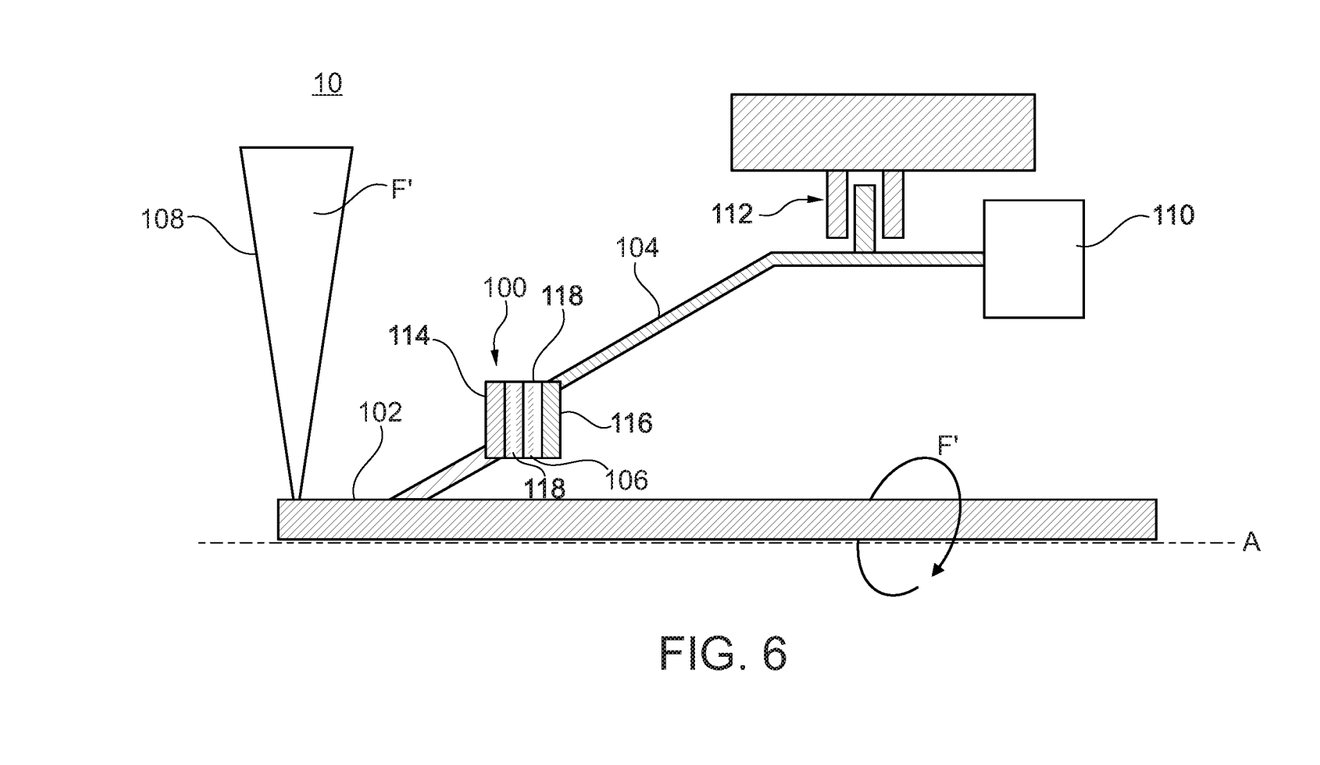
FIG. 6 is a sectional side view of a shaft apparatus.

Referring now to FIG. 6, an exemplary shaft apparatus 100 is shown in a gas turbine engine 10. FIG. 6 shows a schematic cross sectional view of at upper half of the shaft apparatus 100 about the main rotational axis A of the shaft apparatus and, more generally, the gas turbine engine.

The shaft apparatus 100 comprises a first shaft portion 102 and a second shaft portion 104. The first and second shaft portions 102,104 are connected by a ratchet mechanism 106. The ratchet mechanism 106 is configured to permit the first shaft portion 102 to rotate with respect to the second shaft portion 104 in a first direction, and to prevent the first shaft portion 102 from rotating with respect to the second shaft portion 104 in a second direction opposite to the first direction, as will be described in more detail below.

More particularly, in this example, the shaft apparatus 100 is a fan shaft apparatus. The first shaft portion 102 is attached to a fan 108. The first shaft portion is configured to rotate about the axis A such that the fan 108 can be rotated therewith. The first shaft portion 102 may be secured in the axial direction by a thrust bearing (not shown).

The second shaft portion 104 is configured to apply a driving torque to the first shaft portion 102, and may be referred to as a "torque shaft". In particular, the second shaft portion 104 is configured to apply a driving torque to the first shaft portion 102 in a first direction F' (as illustrated by the arrow and 'out of page' dot on the fan 108) about the axis A so as to drive a fan attached to the first shaft portion 102 in the direction F'. It should be understood that the direction F' is clockwise when viewed from the front along the axis A (i.e. the same as direction F in FIGS. 4b and 5b). The second shaft portion 104 in this example is driven by the output of a power gear box 110, for example a gear box as described in relation to FIGS. 1, 2, and 3 above. It should be understood that the principles of the shaft apparatus could also be applied to gas turbine engines without gear boxes, where the second shaft portion could be driven directly by a turbine. In this example, the second shaft portion comprises a thrust bearing 112 which isolates the gear box 110 from axial loads on the second shaft portion.

The ratchet mechanism 106 is configured such that the second shaft portion 104 may not rotate faster than the first shaft portion 102 in the direction F. Accordingly, as the rotation speed of the second shaft portion 104 in direction F' increases, so must the rotation speed of the first shaft portion 102 and the fan 108 (i.e. the first shaft portion 102 must rotate at least as fast as the speed of the second shaft portion 104 in the first direction). This is necessary for the second shaft portion 104 to be able to drive the first shaft portion 102.

It should be understood that the ratchet mechanism 106 does however permit the first shaft portion 102 to rotate faster than the second shaft portion 104 in the first direction. For example, if the second shaft portion is static, rotating in the opposite direction to F', or rotating in the direction F' more slowly than the first shaft portion 102, then the first shaft portion 102 and the fan 108 can rotate relative to the second shaft portion 104 in direction F'.

Furthermore, it should be understood that the ratchet mechanism 106 prevents the first shaft portion 102 from rotating relative to the second shaft portion 104 in a direction opposite to F' (i.e. if the first shaft portion is rotating in the opposite direction to F', then the second shaft portion must also be rotating at the same speed in the that direction). Of course, as illustrated by FIGS. 4 and 5, the fan 108 and thus the first shaft portion 102 would not typically need to rotate in the opposite direction to F' in driven or windmill conditions.

The shaft apparatus 100 is therefore configured such that in normal driven use (per FIG. 4 above) the first shaft portion 102 and therefore the fan 108 can be driven normally by the second shaft portion 104. However, in the event of a seizure of the second shaft portion 104 (for example due to a mechanical failure) or a power failure of the second shaft portion 104, then the first shaft portion 102 and thus the fan 108 is permitted by the ratchet mechanism 106 to windmill in the direction F' relative to the second shaft portion 104. Thus, the drag of the engine can be minimised in an engine failure scenario by virtue of the shaft mechanism 100, maintaining better aircraft control.

In the example of FIG. 6, the ratchet mechanism 106 comprises a first ratchet element 114 configured to rotate with the first shaft portion 102, and a second ratchet element 116 configured to rotate with the second shaft portion 104. Each of the ratchet elements 114,116 comprise a respective ratchet surface 118 for engagement with the ratchet surface 118 of the other ratchet element 114,116. The ratchet mechanism 106 could be any apparatus or assembly which permits relative rotation of the first and second shaft elements in one direction but not the opposing direction. For example, the ratchet elements 114,116 could be curvic couplings (see FIGS. 8 and 9 below) or clutch elements, such as directional clutch elements.

Figure 7A:
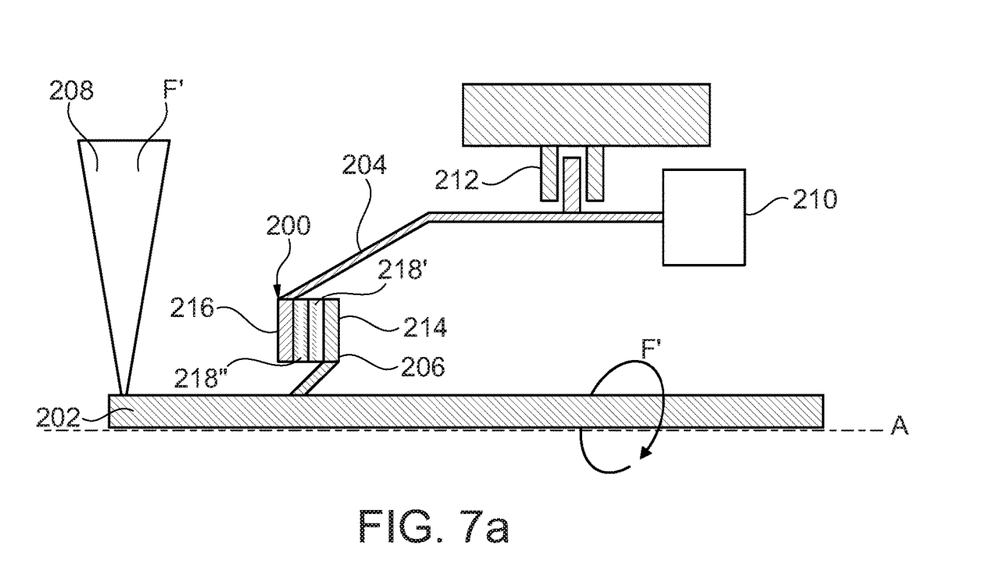
FIGS. 7a and 7b show sectional side views of an alternative shaft apparatus in first, driven, configuration, and second, windmilling, configuration respectively.
Figure 7B:
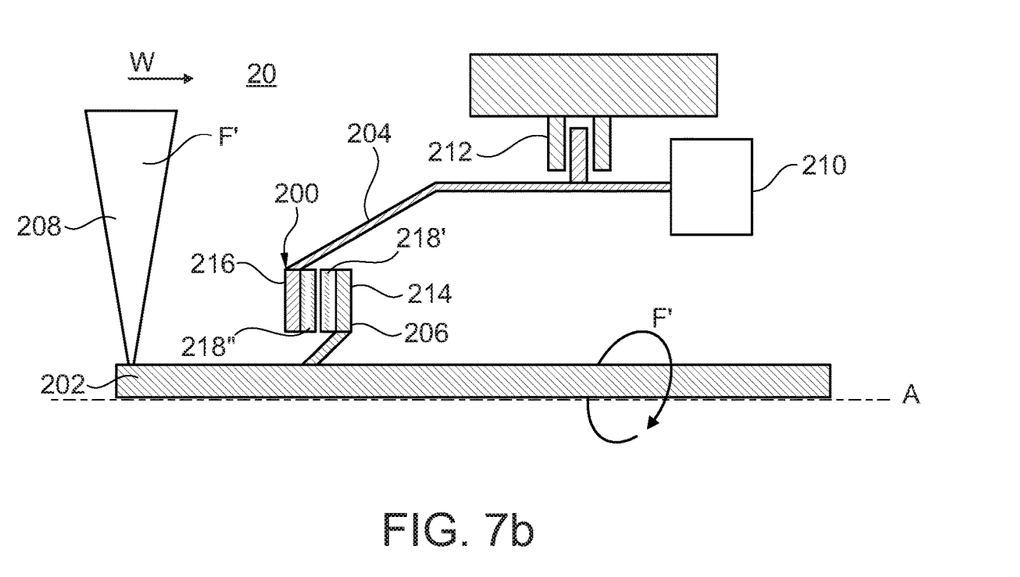

Turning now to FIGS. 7a and 7b, an alternative engine 20 having a further exemplary shaft apparatus 200 is shown. Comparable features between the shaft apparatus 100 and the shaft apparatus 200 are indicated by reference numerals differing by 100.

In FIG. 7a, the engine 20 is shown in a driven condition (per FIGS. 4a and 4b above), while in FIG. 7b, the engine 20 is shown in a windmill condition (per FIGS. 5a and 5b above).

Importantly, in the shaft apparatus 200, the first ratchet element 214 of the first shaft element 202 is arranged axially downstream of the second ratchet element 216 of the second shaft element 204, for reasons which shall be explained further below. Furthermore, the ratchet surface 218' of the first ratchet element 214 is configured to face at least partially upstream in the axial direction and the ratchet surface 218" of the second ratchet element 216 is configured to face at least partially downstream in the axial direction. In this example, the ratchet surfaces 218',218" are both perpendicular to the axis A, but it should be understood that in other examples, the ratchet surfaces could be arranged obliquely to the axis A and achieve similar effects.

The arrangement of the ratchet mechanism 206 of the shaft apparatus 200 is particularly advantageous when considering the forces at play in the system in the driven and windmill conditions as described in relation to FIGS. 4 and 5 above.

In the driven condition, the fan 208 urges the first shaft portion 202 axially forward, meaning that the forward-facing ratchet surface 218' of the first ratchet portion 214 is urged against the rearward facing ratchet surface 218" of the second ratchet portion 216. Accordingly, when driven, the thrust of the fan 208 automatically acts to urge the ratchet mechanism 206 together, thereby maintaining adequate power transmission through the ratchet mechanism from the second shaft portion 204 to the first shaft portion 202 (and thus the fan 208).

However, in the event that the fan enters a windmill condition, such as if the engine 20 has a power failure, or the second shaft portion 204 suffers from seizing, then the air resistance on the fan 208 urges it and the first shaft portion 202 rearward. As the first ratchet portion 214 is arranged rearward of the second ratchet portion 216, the force on the fan 208 urges the first ratchet portion 214 away from the second ratchet portion 216. Accordingly, when windmilling, the air resistance on the fan 208 automatically acts to urge the ratchet mechanism 206 apart, thereby ensuring that the first shaft portion 202 and the fan 208 can rotate freely with respect to the second shaft portion 204.

More generally, it should be understood that the ratchet mechanism 206 is configured such that downstream axial movement of or axial force on the first shaft portion 202 relative to the second shaft portion 204 causes the ratchet surfaces 218',218" of the first and second ratchet elements 214,216 to be disengaged.

Accordingly, the shaft apparatus 200 described herein utilises the inherent forces in the system in the driven and windmill conditions to optimise the operation of the ratchet mechanism 206.

Figure 8A:
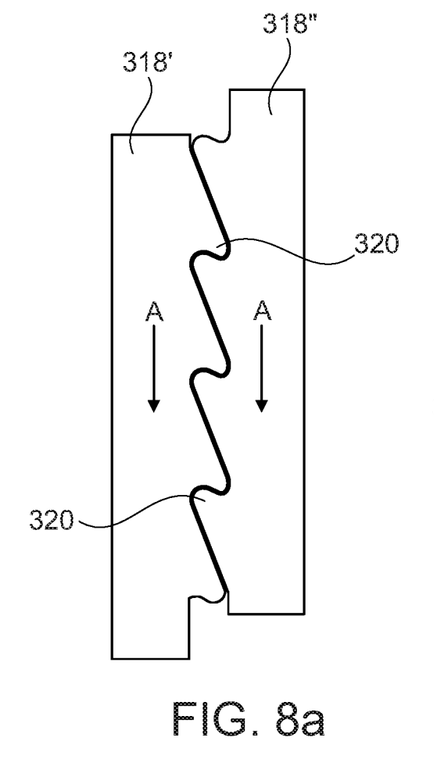
FIGS. 8a and 8b show sectional views of ratchet mechanism in first, driven, configuration, and second, windmilling, configuration respectively.
Figure 8B:
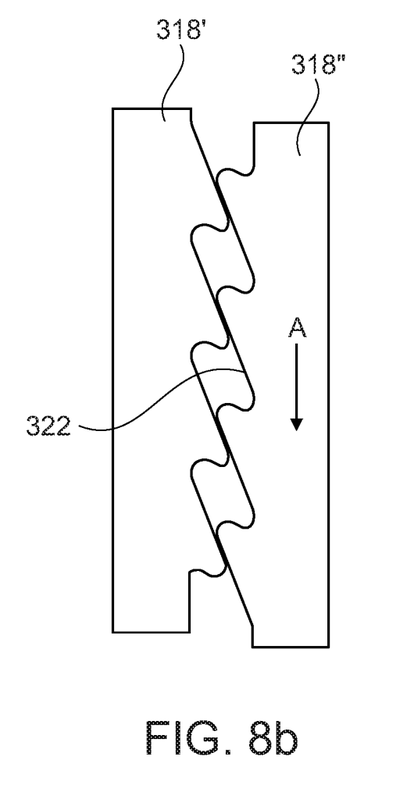

FIGS. 8a and 8b show an exemplary ratchet surface configuration suitable for use in the shaft apparatuses described herein. The ratchet surfaces 318' and 318" each comprise a plurality of complementarily shaped ratchet teeth 320. The ratchet teeth 320 are configured such that they interlock in one direction only.

In the example condition shown in FIG. 8a, the ratchet surface 318' is moving in the direction illustrated by arrow A. Owing to the interlocking of the ratchet teeth 320 of surface 318' with the ratchet teeth 320 of the other ratchet surface 318", the second ratchet surface 318" is driven in the same direction A. This is comparable to a driven condition of the fan, in which the ratchet surface 318' is of the second shaft portion is applying a driving torque to the ratchet surface 318", which of the first shaft portion. In this example, the ratchet teeth have an undercut such that there is no separation of the teeth when torque loaded.

FIG. 8b shows an alternative condition, in which the ratchet surface 318' is static, and the ratchet surface 318" is moving in the direction A. It should be understood that the condition in this illustration could also represent a condition in which both surfaces 318' and 318" are moving in direction A, but surface 318" is moving faster than surface 318'. Here, the ratchet teeth 320 do not interlock such that the ratchet teeth 310 of the second ratchet surface 318" can freely ride past the ratchet teeth 320 of the first ratchet surface 318'. This is comparable to a windmill condition of the fan, in which the ratchet surface 318' is of the second shaft portion which has seized, and the ratchet surface 318" is of the first shaft portion which is rotating with the windmilling fan.

In this example, the ratchet teeth 320 have a friction surface 322 which is configured to maintain frictional engagement in a simple 'power-loss' windmill condition when the second shaft portion is still able to rotate, but slide over one another to allow free rotation of the first shaft portion when the second shaft portion is seized.

Figure 9:
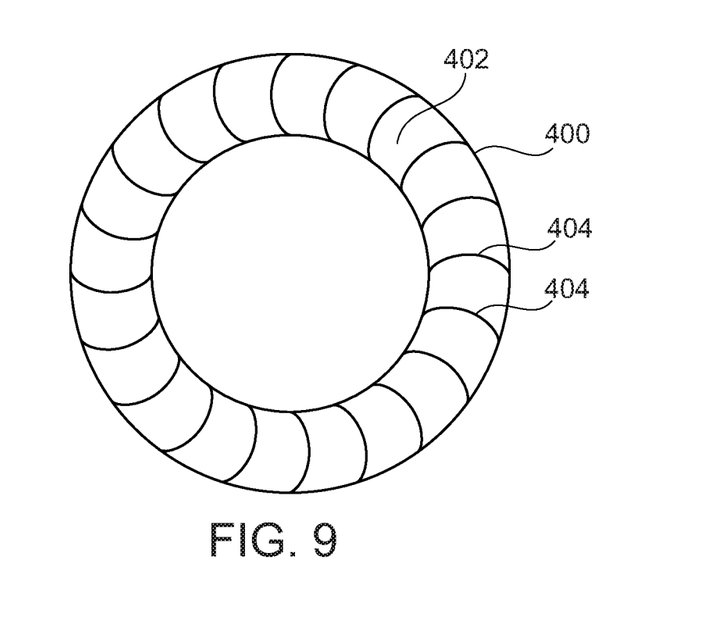
FIG. 9 shows a curvic coupling.

FIG. 9 shows a curvic coupling 400 suitable for use as the first and second ratchet elements of the shaft apparatus. The curvic coupling 400 presents an annular ratchet surface 402 for engagement with a corresponding curvic coupling. The ratchet surface 402 has a plurality of circumferentially spaced curvic teeth 404. Each of the curvic teeth 404 is radially curved. Accordingly, the curvic teeth 404 act inherently to centre the curvic coupling 400 with a corresponding curvic coupling, which ensures that the shaft portions to which the couplings 400 are attached maintain alignment under load despite not being fixedly connected.

It will be understood that the shaft apparatuses described herein permit a method of operating a gas turbine engine in which a fan is permitted to rotate relative to a torque shaft in a first direction, and the fan is prevented from rotating relative to the torque shaft in a second direction opposite to the first direction.

The apparatuses and methods described in the present disclosure provide technical advantages. In normal driven use an engine fan can be driven normally by a torque shaft. However, in the event of a seizure of the torque shaft, then the fan is permitted by the ratchet mechanism to windmill relative to the torque shaft. Thus, the drag of the engine can be minimised in an engine failure scenario by virtue of the shaft mechanism, maintaining better aircraft control. The principles of the present disclosure may be particularly advantageous in a gas turbine engine having a power gear box, as gearboxes might provide additional potential failure routes which could result in a torque shaft seizure.

Some of the embodiments described herein provide additional advantages in exploiting the reversal of axial forces in the engine system between driven and windmill conditions to automatically decouple the first and second shaft portions when required.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A shaft apparatus for a gas turbine engine comprising:
a first shaft portion;
a second shaft portion;
and
a ratchet mechanism configured to permit the first shaft portion to rotate with respect to the second shaft portion in a first direction, to permit the first shaft portion to rotate faster than the second shaft portion in the first direction, and to prevent the first shaft portion from rotating with respect to the second shaft portion in a second direction opposite to the first direction, wherein:
the ratchet mechanism comprises a first ratchet element configured to rotate with the first shaft portion, and a second ratchet element configured to rotate with the second shaft portion,
each of the first and second ratchet elements comprise a respective ratchet surface for engagement with the ratchet surface of the other of the first or second ratchet element; and,
the ratchet mechanism is configured such that downstream axial movement of the first shaft portion relative to the second shaft portion causes the ratchet surfaces of the first and second ratchet elements to be disengaged.

2. The shaft apparatus as claimed in claim 1, wherein the shaft apparatus is a fan shaft apparatus,
the first shaft portion is configured for attachment to a fan of the gas turbine engine, and
the second shaft portion is configured to apply a driving torque to the first shaft portion in the first direction so as to drive the fan attached to the first shaft portion.

3. The shaft apparatus as claimed in claim 1, wherein:
the first ratchet element is arranged axially downstream of the second ratchet element.

4. The shaft apparatus as claimed in claim 1, wherein:
the ratchet surface of the first ratchet element is configured to face at least partially upstream in an axial direction; and
the ratchet surface of the second ratchet element is configured to face at least partially downstream in an axial direction.

5. The shaft apparatus as claimed in claim 1, wherein:
the ratchet mechanism comprises a curvic coupling.

6. The shaft apparatus as claimed in claim 1, wherein:
the ratchet mechanism comprises a clutch.

7. A gas turbine engine for an aircraft comprising:
a shaft apparatus according to claim 1.

8. A gas turbine engine for an aircraft, the gas turbine engine comprising:
a shaft apparatus for the gas turbine engine, the shaft apparatus comprising:
a first shaft portion;
a second shaft portion; and
a ratchet mechanism configured to permit the first shaft portion to rotate with respect to the second shaft portion in a first direction and to prevent the first shaft portion from rotating with respect to the second shaft portion in a second direction opposite to the first direction, wherein:
the ratchet mechanism comprises a first ratchet element configured to rotate with the first shaft portion, and a second ratchet element configured to rotate with the second shaft portion;
each of the first and second ratchet elements comprise a respective ratchet surface for engagement with the ratchet surface of the other of the first or second ratchet element; and
the ratchet mechanism is configured such that downstream axial movement of the first shaft portion relative to the second shaft portion causes the ratchet surfaces of the first and second ratchet elements to be disengaged;
an engine core comprising a turbine, a compressor, and a core shaft connecting the turbine to the compressor;
a fan located upstream of the engine core, the fan comprising a plurality of fan blades and being attached to the first shaft portion; and
a gearbox that receives an input from the core shaft and outputs drive to the fan via the second shaft portion so as to drive the fan at a lower rotational speed than the core shaft.

9. The gas turbine engine as claimed in claim 8, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

10. A method of operating a gas turbine engine comprising a fan and a torque shaft for driving the fan in a first direction, the method comprising:
permitting the fan to rotate relative to the torque shaft in the first direction, and
preventing the fan from rotating relative to the torque shaft in a second direction opposite to the first direction, wherein:
the shaft apparatus as claimed in claim 1 is provided to permit and prevent relative rotation of the fan with respect to the torque shaft in the first and second directions respectively.

11. The gas turbine engine as claimed in claim 8, wherein the ratchet mechanism is configured to permit the first shaft portion to rotate faster than the second shaft portion in the first direction.

12. A shaft apparatus for a gas turbine engine comprising:
a first shaft assembly including a first shaft portion configured to rotate about an axis of the gas turbine engine, a fan coupled to the first shaft portion at a first end of the first shaft portion for rotation therewith, and a thrust bearing engaged with a second end of the first shaft portion opposite the first end;
a second shaft portion configured to be rotated about the axis by a power source; and
a ratchet mechanism that extends between and interconnects the first shaft portion and the second shaft portion, the ratchet mechanism including a first ratchet element coupled to the first shaft portion for rotation with the first shaft portion and a second ratchet element coupled to the second shaft portion for rotation with the second shaft portion, and the first ratchet element shaped to define a first ratchet surface that faces axially aft and the second ratchet element shaped to define a second ratchet surface that faces axially forward,
wherein the first ratchet element of the ratchet mechanism is configured to change between (i) an engaged position in which the first ratchet surface of the first ratchet element engages the second ratchet surface of the second ratchet element to cause the second shaft to rotate with the first shaft in a first direction about the axis when the shaft apparatus is in a drive condition in which a tensile axial load in the first shaft portion urges the first ratchet element axially forward and (ii) a disengaged position in which the first ratchet surface of the first ratchet element is spaced apart from the second ratchet surface of the second ratchet element to allow the first shaft assembly to rotate freely relative to the second shaft when the shaft apparatus is in a windmill condition in which a compressive axial load in the first shaft portion urges the first ratchet element axially aft away from the second ratchet element.

* * * * *